(12) United States Patent
Shundo et al.

(10) Patent No.: US 10,466,009 B1
(45) Date of Patent: Nov. 5, 2019

(54) SPINNER MOUNTED GUN SYSTEM (71) Applicant: Bell Helicopter Textron Inc., Fort Worth, TX (US)

(72) Inventors: Ken Shundo, Keller, TX (US); Michael Dean Dearman, Weatherford, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 0 days.

(21) Appl. No.: 16/021,845

(22) Filed: Jun. 28, 2018

(51) Int. Cl.
*F41A 27/20* (2006.01)
*B64D 7/04* (2006.01)
*F41A 27/28* (2006.01)
*F41A 23/24* (2006.01)

(52) U.S. Cl.
CPC .............. *F41A 27/20* (2013.01); *B64D 7/04* (2013.01); *F41A 23/24* (2013.01); *F41A 27/28* (2013.01)

(58) Field of Classification Search
CPC ...... B64D 7/00–08; F41A 23/24; F41A 27/20; F41A 27/28; F41F 3/06
USPC ...... 89/37.16–37.19, 12, 133, 160; 244/7, 8, 244/10, 12.4–12.5, 17.11, 17.23, 17.25, 244/17.27, 65, 66
See application file for complete search history.

(56) References Cited

U.S. PATENT DOCUMENTS

| | | | | |
|---|---|---|---|---|
| 2,014,876 A * | 9/1935 | Birkigt | ..................... | B64D 7/02 89/14.3 |
| 2,335,449 A * | 11/1943 | Salisbury | .................. | F41A 9/04 89/33.14 |
| 2,353,773 A * | 7/1944 | Unterberg | ............. | B64C 11/346 416/157 R |
| 2,375,437 A * | 5/1945 | O'Hare | ..................... | F41A 9/79 193/25 AC |
| 2,378,670 A * | 6/1945 | Walle, Sr. | ............... | F41A 17/08 200/19.2 |
| 2,401,989 A * | 6/1946 | Trotter | ...................... | F41A 9/54 89/33.14 |
| 2,494,368 A * | 1/1950 | Steele | ........................ | B64C 1/36 244/1 A |
| 4,624,425 A * | 11/1986 | Austin | .................... | B64C 1/061 244/118.1 |
| 5,219,133 A * | 6/1993 | Christian | .................. | B64D 7/08 244/137.4 |
| 5,932,831 A * | 8/1999 | Bandera | .................... | B64D 7/00 89/33.14 |
| 8,140,200 B2 * | 3/2012 | Heppe | .................. | B64C 39/024 701/16 |
| 2017/0073070 A1 * | 3/2017 | Xing | ..................... | B64C 39/024 |
| 2017/0088247 A1 * | 3/2017 | Hallquist | ............. | F41H 5/0407 |

* cited by examiner

*Primary Examiner* — Stephen Johnson
*Assistant Examiner* — Benjamin S Gomberg
(74) *Attorney, Agent, or Firm* — Winstead PC (57) ABSTRACT

A spinner mounted gun system includes a receiver and a barrel connected to a mast of a rotorcraft.

19 Claims, 6 Drawing Sheets

SPINNER MOUNTED GUN SYSTEM

BACKGROUND

This section provides background information to facilitate a better understanding of the various aspects of the disclosure. It should be understood that the statements in this section of this document are to be read in this light, and not as admissions of prior art.

Aircraft are often armed with weapons; however, heretofore weapons have not been mounted in the spinner of a rotorcraft. In aircraft, such as the P-39 Airacobra built prior to World War II, a barrel of a gun (37 mm cannon) passed through the spinner with the magazine and the receiver located aft of the propeller in the fuselage. The gun system mounted in the P-39 remained stationary relative to the fuselage and did not rotate with the spinner. To accommodate the cannon, the P-39 mounted the engine behind the pilot and driving the tractor propeller through a long drive shaft offset from the centerline of the propeller hub.

SUMMARY

An exemplary rotating system mounted gun system includes weapon connected to a mast of a rotorcraft. Another exemplary rotating system mounted gun system includes a receiver and a barrel connected to a mast with the receiver positioned inside a spinner and the barrel extending out of the barrel, and the weapon rotates with the spinner and the mast.

An exemplary rotorcraft includes a rotating system with rotor blades connected to a mast through a hub and a weapon connected to the mast. Another exemplary rotorcraft includes an engine coupled to rotor blades through a mast, a spinner connected with the mast to rotate with the mast and the rotor blades, and a weapon including a receiver and a barrel connected to the mast with the receiver positioned inside the spinner and the barrel extending out of the spinner.

An exemplary method includes flying a tiltrotor aircraft having a propulsion system with an engine coupled to rotor blades through a mast, a weapon connected to the mast, and firing the weapon while flying the tiltrotor aircraft. Another exemplary method includes flying a tiltrotor aircraft having a propulsion system with an engine coupled to rotor blades through a mast, a spinner connected with the mast to rotate with the mast and the rotor blades, and a gun system including a receiver and a barrel connected to the mast outboard of the rotor blades with the receiver positioned inside the spinner and the barrel extending out of the spinner; and firing the gun system while flying the tiltrotor aircraft.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements they are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrative embodiment. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not in itself dictate a relationship between the various embodiments and/or configurations discussed.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Figure 1:
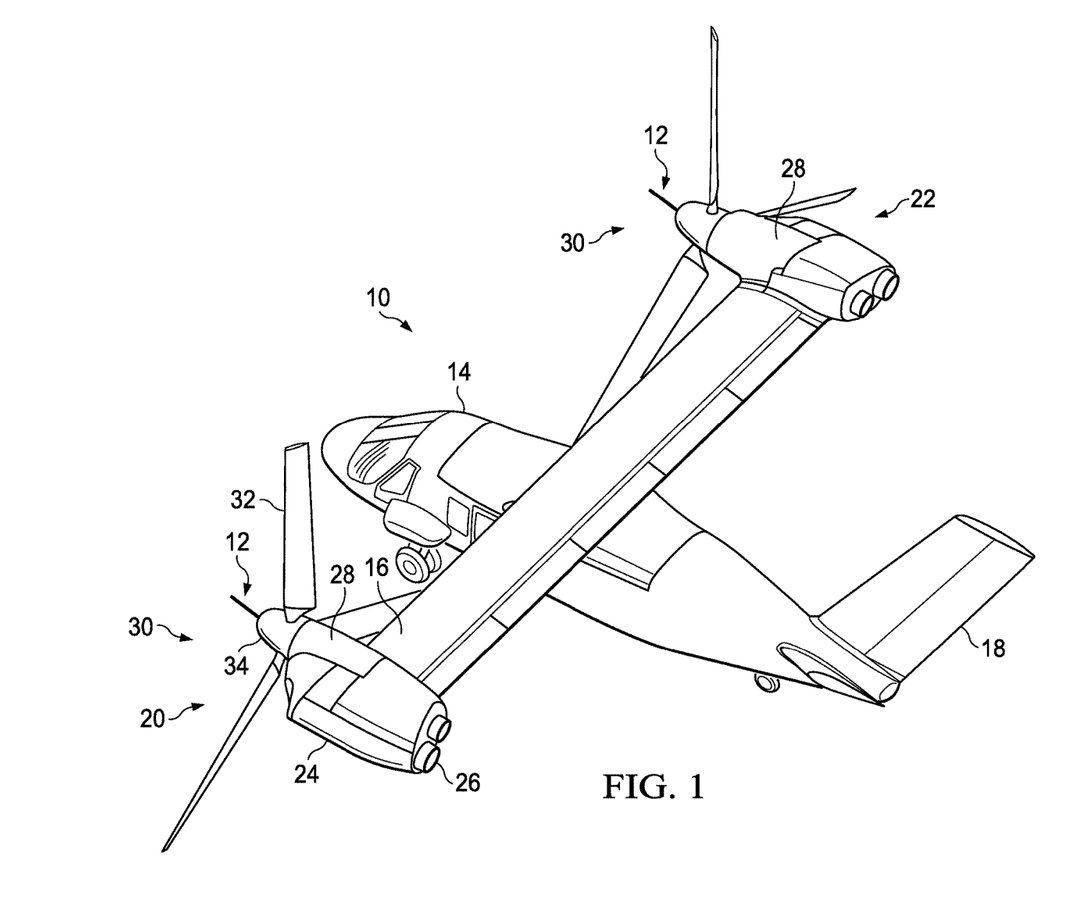
FIGS. 1 and 2 illustrate exemplary rotorcraft implementing a spinner mounted gun system according to one or more aspects of the disclosure.
Figure 2:
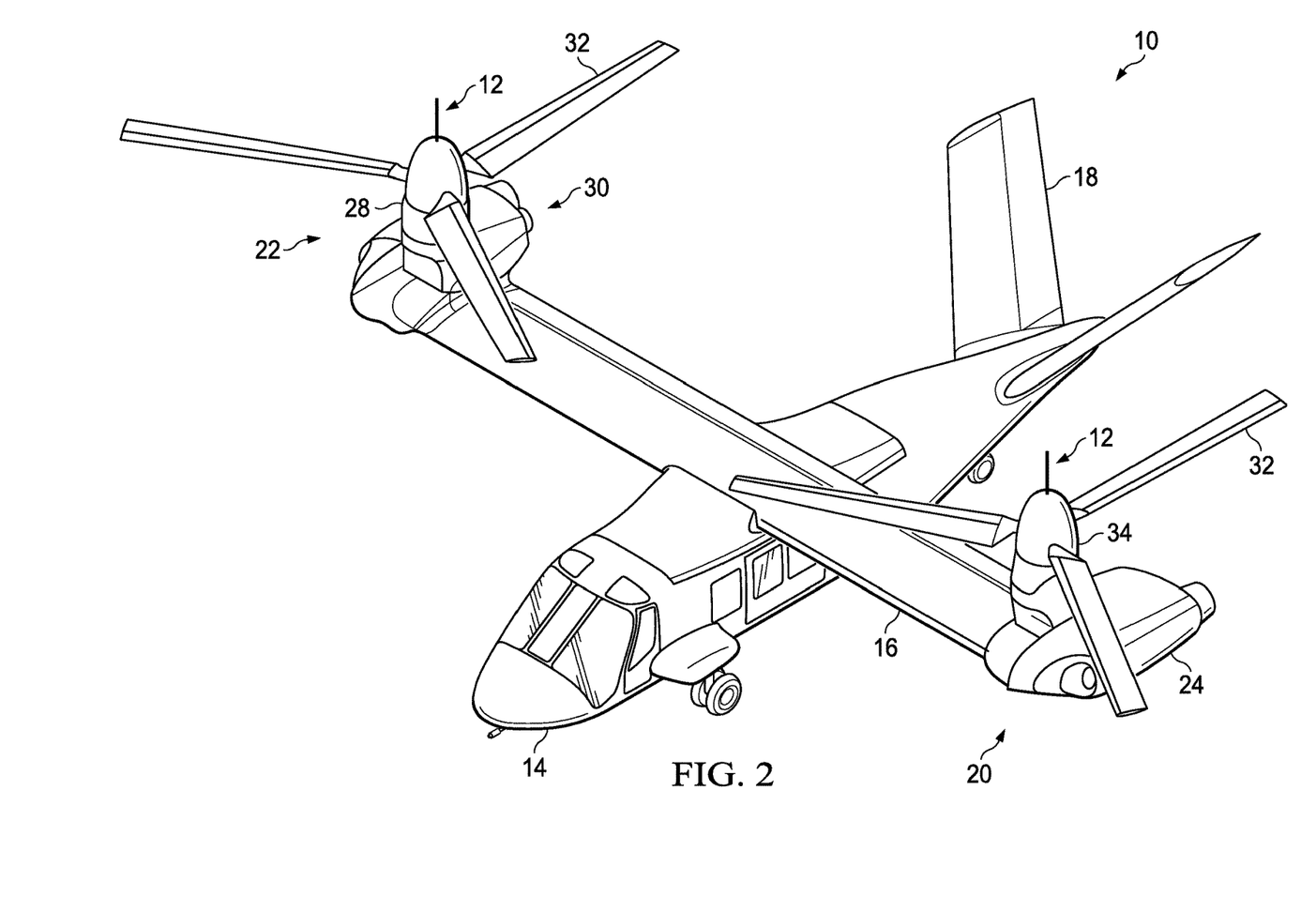

FIGS. 1 and 2 illustrate an exemplary rotorcraft 10 incorporating a spinner mounted gun system 12. "Rotorcraft" is used herein to mean any vehicle with a forward-facing or rear-facing rotating mast carrying rotor blades. The illustrated rotorcraft 10 is a tiltrotor aircraft 10 having a fuselage 14, a wing 16 that may be rotatable relative to fuselage 14, and a tail assembly 18 having control surfaces operable for horizontal and/or vertical stabilization during forward flight. Together, fuselage 14, wing 16, and tail assembly 18 as well as their various frames, longerons, stringers, bulkheads, spars, ribs, skins and the like may be considered to be the airframe of rotorcraft 10.

Located proximate the outboard ends of wing 16 are propulsion systems 20, 22. The propulsion system 20 is substantially symmetric to propulsion system 22; therefore, for the sake of efficiency certain features will be disclosed only with regard to propulsion system 20. However, one of ordinary skill in the art would fully appreciate an understanding of propulsion system 22 based upon the disclosure herein of propulsion system 20.

In this illustrated embodiment, propulsion system 20 includes a fixed nacelle 24 that houses the engine 26 and a fixed portion of the drive system. Propulsion system 20 includes a pylon assembly 28 that is positioned inboard of fixed nacelle 24 and above wing 16. Pylon assembly 28 is rotatable relative to fixed nacelle 24 and wing 16 between a generally horizontal orientation, as best seen in FIG. 1, and a generally vertical orientation, as best seen in FIG. 2. Pylon assembly 28 includes a rotatable portion of the drive system and proprotor assembly 30 that is rotatable responsive to torque and rotational energy provided via the engine and drive system. Each proprotor assembly 30 has a plurality of rotor blades 32 connected to a hub (e.g., gimbaled joint, yoke, rotating controls) beneath an aerodynamic fairing, referred to as a spinner 34. Embodiments of the gun system 12 are described as being mounted with a spinner, however, it should be recognized that the gun system is mounted with the rotating system of the rotorcraft, whether the rotorcraft utilizes a spinner or not.

It should be appreciated that rotorcraft 10 is merely illustrative of a variety of aircraft that can implement the gun system 12. Other aircraft implementations can include hybrid aircraft, unmanned aircraft, and a variety of airplane configurations, to name a few examples.

Figure 3:
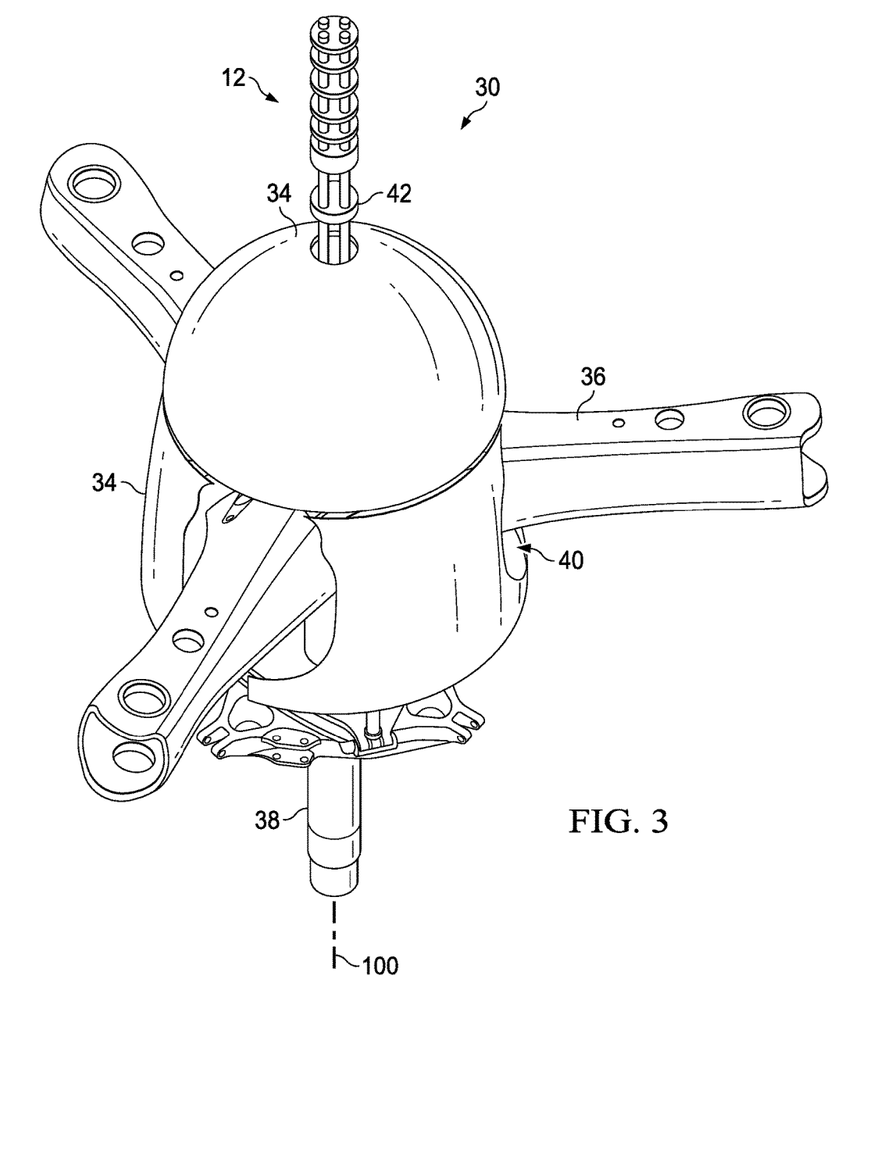
FIG. 3 is an isolated view of a portion of an exemplary proprotor assembly implementing a spinner mounted gun system according to one or more aspects of the disclosure.

FIG. 3 is an isolated, oblique view of a portion of an illustrative proprotor assembly 30. The proprotor assembly 30 comprises a grip and yoke assembly 36 for securing rotor blades 32 (shown in FIGS. 1 and 2) to a mast 38. Openings 40 are formed in spinner 34 allowing portions of the yoke assembly 36 to protrude for attachment of rotor blades 32. The mast 38 is connected to an output of the engine for transfer of torque from the engine to mast 38. The barrel 42 is generally coaxially aligned with the axis 100 of mast 38 and the barrel 42 extends through the apex of the spinner 34.

Figure 4:
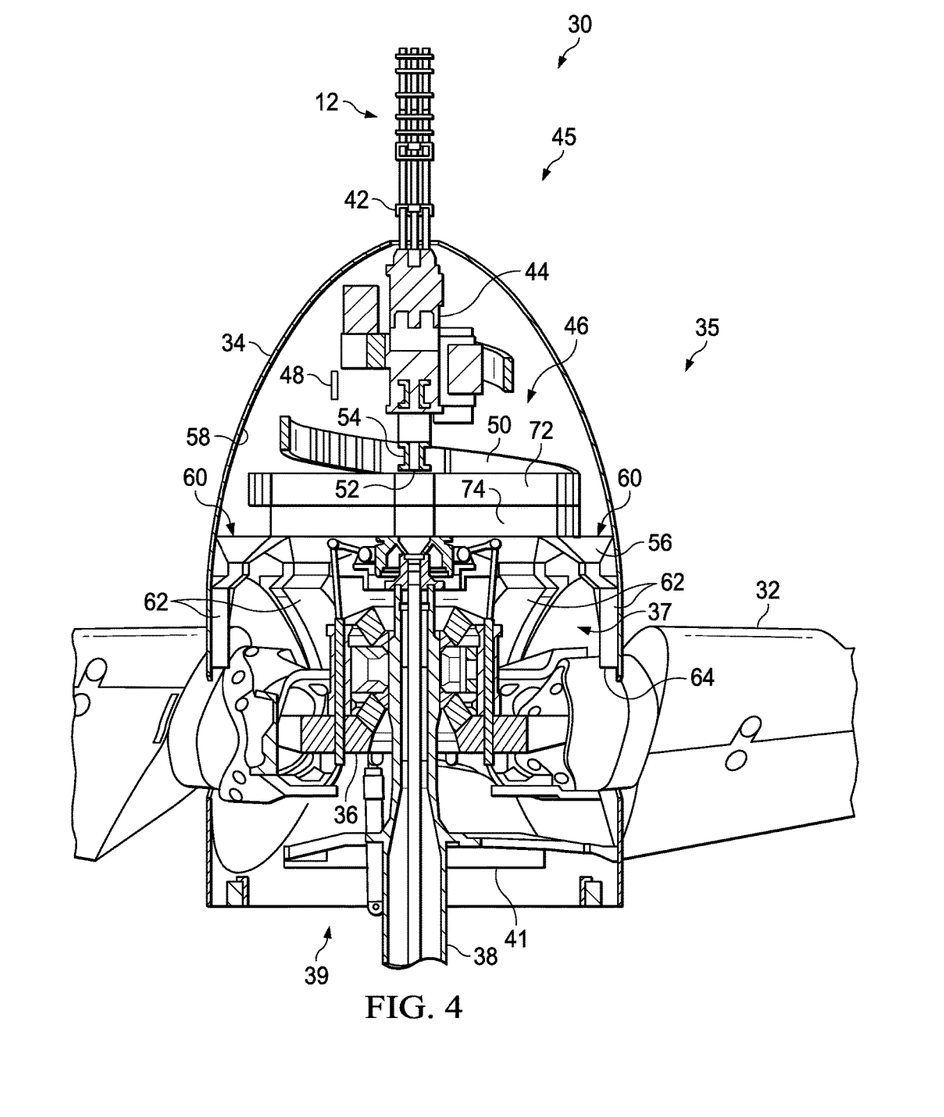
FIG. 4 is a cutaway view of an exemplary proprotor assembly implementing a spinner mounted gun system according to one or more aspects of the disclosure.
Figure 5:
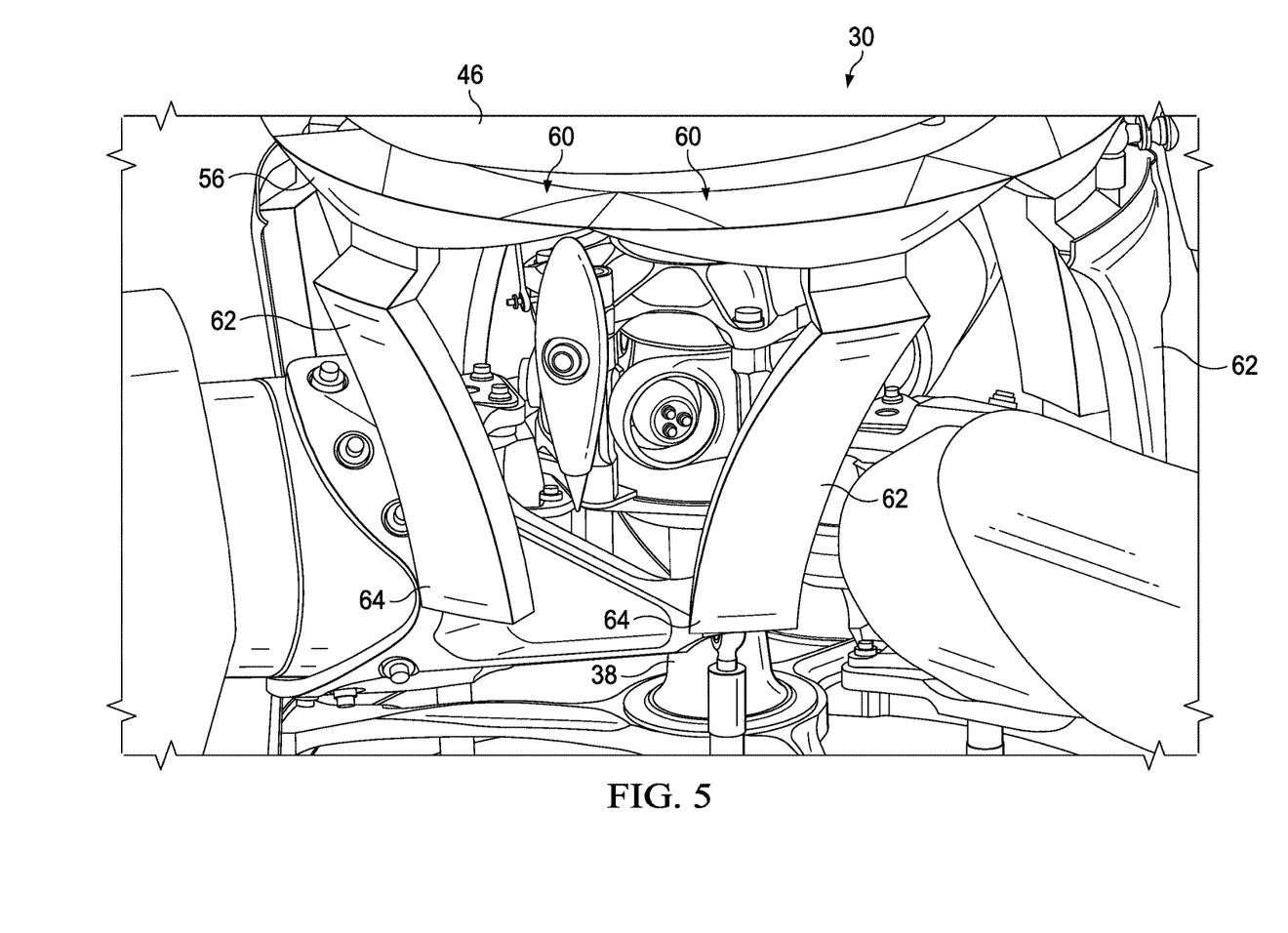
FIG. 5 is an isolated view of a portion of a proprotor assembly, with the spinner removed, implementing a spinner mounted gun system according to one or more aspects of the disclosure.

With reference in particular to FIG. 4, the gun system 12 includes a weapon 45 having a barrel 42 and a receiver 44, and a magazine 46. The gun system 12 is located with the rotating system 35 outboard of the rotating control 37. In FIG. 4, the rotating controls 37 include a hub 39 connecting the rotor blades to the mast 38. The hub 39 includes, for example, the yoke assembly 36 (e.g., grips, gimbaled joint), and the swashplate 41. The gun system 12 rotates with rotating system 35.

Weapon 45 is shown in FIG. 4 as an externally powered rotary-style gun firing a rifle caliber, however, different types of gun systems can be utilized, such as and without limitation an M2 machine gun, other rifle caliber weapons, and mortar weapons. In FIG. 4, the magazine 46 comprises cartridges 48 interconnected in a belt 50.

Weapon 45 is connected, directly or indirectly, to the mast 38 to rotate with mast 38. In FIG. 4, weapon 45 is attached at the outboard end 52 of mast 38 via a mount 54. In some embodiments, the weapon 45 may be connected to the mast 38 through the yoke assembly 36. Mount 54, illustrated in FIG. 4, is an elongated member or bracket orienting the barrel 42 to fire along a trajectory relative to the axis 100 of the mast 38. In an exemplary embodiment, illustrated in FIG. 7, the mount 54 is motorized and operationally connected to controls (e.g., controller 68) located in the fuselage so that an operator can articulate the barrel 42 to change the trajectory of the fired rounds. In an exemplary embodiment, the controller 68 includes phasing to actuate the weapon to match the target trajectory as the weapon cycles through an elliptical path.

In an exemplary embodiment, a floor is positioned between the receiver 44 and the rotating controls 37. With reference to FIG. 4, the floor 56 is connected to the mast 38 outboard of the yoke assembly 36. The floor 56 comprises a planar member having a circumference generally conforming to the inner circumference 58 of the spinner 34. The floor 56 includes one or more openings 60 located at the outer circumference of the floor adjacent to the spinner 34. Each of the openings 60 is connected to a chute 62 that extends axially away from the weapon 45 in the inboard direction. The spent cartridges 48 are ejected from the receiver 44, travel radially outward to the inner circumference 58 of the spinner 34, and through the opening 60 into the associated chute 62. Chute 62 may be a housing forming a passage extending from the opening 60 at the outboard end to a terminal end 64. In an exemplary embodiment, the chute 62 is closed at the terminal end 64 so that the spent cartridges 48 and belt links are contained within the chutes 62 for removal after the rotorcraft has landed. In another exemplary embodiment, the terminal end 64 is open to discharge the spent cartridges out of the spinner 34, for example through the opening 40 (FIG. 3) or through another opening in the fairing. In an exemplary embodiment, the spent cartridges 48 are ejected from the chute 62 at a position inboard of the yoke assembly 36 and the rotor blades 32. In an exemplary embodiment, the chute 62 is operationally connected to a passage located in the non-spinning section of the nacelle.

Figure 6:
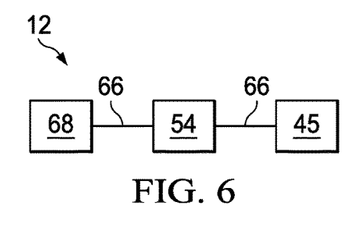
FIG. 6 illustrates an exemplary magazine of a spinner mounted gun system according to one or more aspects of the disclosure.
Figure 7:
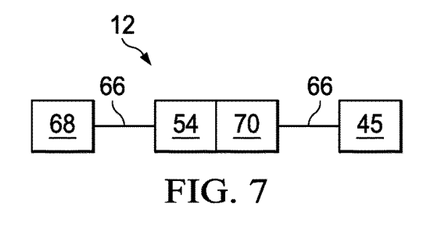
FIG. 7 illustrates another exemplary magazine of a spinner mounted gun system according to one or more aspects of the disclosure.

FIGS. 6 and 7 schematically illustrate exemplary embodiments of gun system 12. FIGS. 6 and 7 are described with reference to FIGS. 1-4. The weapon 45 is operationally connected by communication lines 66 to a controller 68 located within the fuselage 14 of the rotorcraft so that an operator can fire weapon 45. In FIG. 7, the mount 54 is motorized, e.g., actuator 70, to articulate the weapon 45 relative to the axis of the mast 38. The motorized mount 54 and weapon 45 are operationally connected to the controller 68 in the fuselage 14 of the rotorcraft. The communication lines 66 extend for example through the interior of the mast 38.

Figure 8:
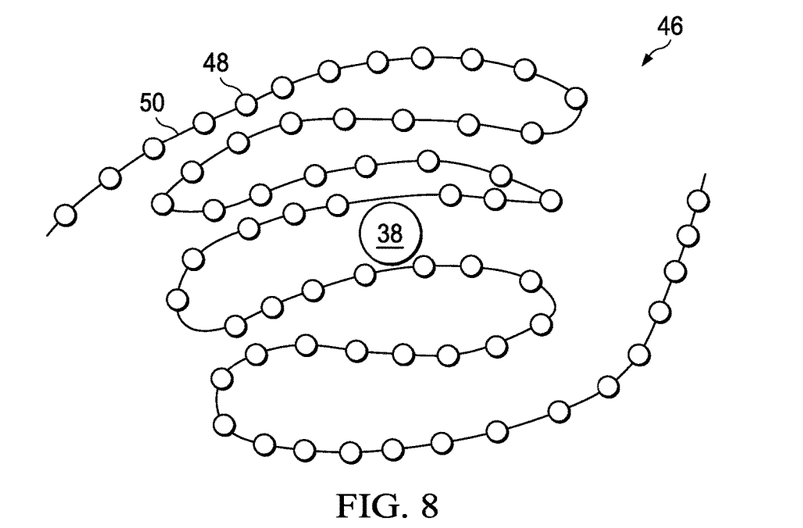
FIG. 8 illustrates an exemplary configuration of cartridges in a magazine according to one or more aspects of the disclosure.
Figure 9:
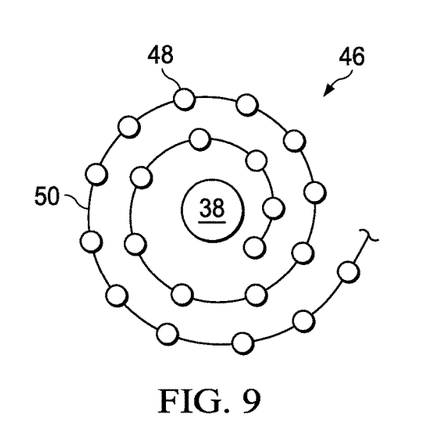
FIG. 9 illustrates another exemplary configuration of cartridges in a magazine according to one or more aspects of the disclosure.

FIG. 8 illustrates an exemplary arrangement of a belt 50 of cartridges 48 in a serpentine configuration relative to the mast 38. FIG. 9 illustrates an exemplary arrangement of a belt 50 of cartridges 48 in a wound, circular configuration relative to the mast 38. With additional reference to FIG. 4, the magazine 46 may include a belt 50 of cartridges 48 arranged in a single level or two or more stacked planar levels. When the magazine 46 includes two or more levels, the belt 50 may be arranged in the same configuration in each of the levels or the belt 50 may be arranged in a different configuration in one level from another level.

In an exemplary embodiment, the magazine 46 includes a belt 50 of cartridges 48 arranged in two levels 72, 74. In an embodiment, the first level 72 is the outboard level and fed into the receiver 44 prior to the additional level 74. The additional level 74 is located between the first level 72 and the yoke assembly 36. In an exemplary embodiment, the belt 50 is arranged in a serpentine configuration (FIG. 8) in the first level 72 and arranged in a wound circular configuration (FIG. 9) in the additional level 74.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A gun system, comprising a weapon connected to a mast of a rotorcraft, the weapon comprising a receiver and a barrel, wherein the weapon rotates with the mast.

2. The gun system of claim 1, wherein the barrel is generally coaxially aligned with the mast.

3. The gun system of claim 1, wherein the weapon is connected to the mast by a motorized mount configured to articulate the barrel.

4. The gun system of claim 1, further comprising a magazine with cartridges located between the receiver and rotating controls, wherein the rotating controls comprise a hub.

5. The gun system of claim 1, further comprising a floor located between the receiver and rotating controls, wherein the rotating controls comprise a hub; and
   a chute extending, in an inboard direction, from an opening in the floor to a terminal end.

6. The gun system of claim 5, wherein the terminal end is closed.

7. The gun system of claim 5, further comprising a magazine with cartridges located between the receiver and the rotating controls.

8. The gun system of claim 5, wherein the barrel is connected to the mast by a motorized mount configured to articulate the barrel.

9. The gun system of claim 5, further comprising a magazine with cartridges located between the receiver and the rotating controls, wherein the barrel, the receiver, and the floor rotate with the mast.

10. A rotorcraft, comprising:
    a rotating system including rotor blades connected to a mast through a hub; and
    a weapon connected to the mast, the weapon comprising a receiver and a barrel, wherein the weapon rotates with the mast.

11. The rotorcraft of claim 10, further comprising a magazine with cartridges located in the rotating system and operationally connected to the receiver.

12. The rotorcraft of claim 10, wherein the weapon is connected to the mast by a motorized mount configured to articulate the barrel.

13. The rotorcraft of claim 10, further comprising a spinner connected with the mast;
    a floor located in the spinner between the receiver and rotation controls, wherein the rotating controls comprise the hub; and
    a chute extending, in an inboard direction, from an opening in the floor to a terminal end.

14. The rotorcraft of claim 13, wherein the terminal end is closed.

15. The rotorcraft of claim 10, further comprising a spinner connected with the mast;
    a floor located in the spinner between the receiver and the rotor blades;
    a chute extending, in an inboard direction, from an opening in the floor to a terminal end; and
    a magazine with cartridges located in the rotating section and operationally connected to the receiver.

16. The rotorcraft of claim 15, wherein the cartridges are connected in a belt arranged in a serpentine configuration.

17. A method, comprising:
    flying a tiltrotor aircraft comprising a propulsion system having an engine coupled to rotor blades through a mast, and a weapon comprising a receiver and a barrel connected to the mast; and
    firing the weapon while flying the tiltrotor aircraft, wherein the weapon rotates with the mast.

18. The method of claim 17, further comprising receiving spent cartridges ejected from the weapon in a chute, wherein the chute extends, in an inboard direction, from an opening in a floor located between the receiver and rotating controls, wherein the rotating controls comprise a hub.

19. The method of claim 18, wherein the floor is positioned inside a spinner connected to the mast.

* * * * *

UNITED STATES PATENT AND TRADEMARK OFFICE
CERTIFICATE OF CORRECTION

PATENT NO. : 10,466,009 B1
APPLICATION NO. : 16/021845
DATED : November 5, 2019
INVENTOR(S) : Ken Shundo et al.

It is certified that error appears in the above-identified patent and that said Letters Patent is hereby corrected as shown below:

In the Claims

Column 6, Lines 27-28  Replace "between the receiver and rotation controls," with
Claim 13              -- between the receiver and rotating controls, --

Column 6, Line 41     Replace "cartridges located in the rotating section" with
Claim 15              -- cartridges located in the rotating system --

Signed and Sealed this
Ninth Day of June, 2020

Andrei Iancu
*Director of the United States Patent and Trademark Office*